US012340695B2

(12) United States Patent
Tanaka et al.

(10) Patent No.: US 12,340,695 B2
(45) Date of Patent: Jun. 24, 2025

(54) VEHICLE DISPATCH DEVICE, VEHICLE DISPATCH SYSTEM, ON-VEHICLE DEVICE, AND VEHICLE DISPATCH METHOD

(71) Applicant: DENSO TEN Limited, Kobe (JP)

(72) Inventors: Shinichi Tanaka, Kobe (JP); Natsumi Nishiyama, Kobe (JP); Toshiyuki Moribayashi, Kobe (JP); Ryo Matsui, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 189 days.

(21) Appl. No.: 18/026,555

(22) PCT Filed: Oct. 2, 2020

(86) PCT No.: PCT/JP2020/037663

§ 371 (c)(1),
(2) Date: Mar. 15, 2023

(87) PCT Pub. No.: WO2022/070430

PCT Pub. Date: Apr. 7, 2022

(65) Prior Publication Data

US 2023/0343219 A1 Oct. 26, 2023

(51) Int. Cl.
*G08G 1/00* (2006.01)
*G06Q 50/40* (2024.01)

(52) U.S. Cl.
CPC ............. *G08G 1/202* (2013.01); *G06Q 50/40* (2024.01)

(58) Field of Classification Search
CPC ......... G08G 1/202; G08G 1/123; G06Q 50/40
See application file for complete search history.

(56) References Cited

U.S. PATENT DOCUMENTS

| | | | | |
|---|---|---|---|---|
| 2017/0039504 | A1* | 2/2017 | Ullman | G07B 15/02 |
| 2018/0211541 | A1* | 7/2018 | Rakah | G06Q 10/047 |
| 2019/0072400 | A1* | 3/2019 | Chamberlain | G07C 9/37 |

FOREIGN PATENT DOCUMENTS

| | | | |
|---|---|---|---|
| JP | 2016-181156 | A | 10/2016 |
| JP | 2017-091363 | A | 5/2017 |
| JP | 2019-106161 | A | 6/2019 |
| WO | 2018/230533 | A1 | 12/2018 |

* cited by examiner

*Primary Examiner* — Omeed Alizada
(74) *Attorney, Agent, or Firm* — Oliff PLC

(57) ABSTRACT

A vehicle dispatch device includes a change information receipt unit, and a re-matching unit. The change information receipt unit receives change information that indicates that a customer without a reservation other than a customer with a reservation takes a taxi that is instructed to be dispatched to the customer with a reservation. The re-matching unit in a case where the change information is received by the change information receipt unit executes re-matching between the customer with a reservation and a taxi and executes notification of a vehicle dispatch instruction to a taxi that is based on a result of re-matching.

8 Claims, 9 Drawing Sheets

VEHICLE DISPATCH DEVICE, VEHICLE DISPATCH SYSTEM, ON-VEHICLE DEVICE, AND VEHICLE DISPATCH METHOD

CROSS-REFERENCE TO RELATED APPLICATION(S)

This application is a national stage application of International Application No. PCT/JP2020/037663, filed on Oct. 2, 2020, which designates the United States, the entire contents of which are herein incorporated by reference.

FIELD

A disclosed embodiment(s) relate(s) to a vehicle dispatch device, a vehicle dispatch system, an on-vehicle device, and a vehicle dispatch method.

BACKGROUND

A vehicle dispatch device has conventionally been provided that, in a case where a vehicle dispatch reservation for a taxi is accepted from a terminal device of a customer, selects a taxi that desires transportation of the customer is selected and dispatches it to a place of the customer (see, for example, Patent Literature 1).

CITATION LIST

Patent Literature

Patent Literature 1: Japanese Laid-open Patent Publication No. 2016-181156

SUMMARY

Technical Problem

However, in a case where vehicle dispatch reservations for a taxi are executed at substantially simultaneous timings by multiple customers in an identical stop area and/or adjacent points, meeting at a specified pickup point is difficult for a combination of a taxi and a customer that is established at a time of a vehicle dispatch reservation, so that a relationship between multiple customers and multiple taxis is provided in an apparent situation and mutually corresponding targets are not readily found. Hence, it is not possible to guide such customers to taxis and cause them to take such vehicles smoothly. In particular, in a crowded situation, it is difficult for both a taxi and a customer to move, so that a difficulty is caused in taking a vehicle for a combination of a taxi and a customer that is established at a time of a vehicle dispatch reservation.

An aspect of an embodiment is provided by taking the above into consideration and aims to provide a vehicle dispatch device, a vehicle dispatch system, an on-vehicle device, and a vehicle dispatch method that are capable of causing each customer to take an appropriate taxi smoothly even in a case where multiple dispatched taxis and multiple customers are mixed adjacently, such as a case where vehicle dispatch reservations are executed at substantially simultaneous timings in an identical stop area and/or adjacent points.

Solution to Problem

A vehicle dispatch device according to an aspect of an embodiment includes a change information receipt unit and a re-matching unit. The change information receipt unit receives change information that indicates that a customer without a reservation other than a customer with a reservation takes a taxi that is instructed to be dispatched to the customer with a reservation. The re-matching unit in a case where the change information is received by the change information receipt unit executes re-matching between the customer with a reservation and a taxi and executes notification of a vehicle dispatch instruction to a taxi that is based on a result of re-matching.

Advantageous Effects of Invention

A vehicle dispatch device, a vehicle dispatch system, an on-vehicle device, and a vehicle dispatch method according to an aspect of an embodiment provide an advantageous effect in such a manner that it is possible to cause each customer to take an appropriate taxi smoothly even in a case where multiple dispatched taxis and multiple customers are mixed adjacently, such as a case where vehicle dispatch reservations are executed at substantially simultaneous timings in an identical stop area and/or spot adjacent points.

DESCRIPTION OF EMBODIMENTS

Figure 1:
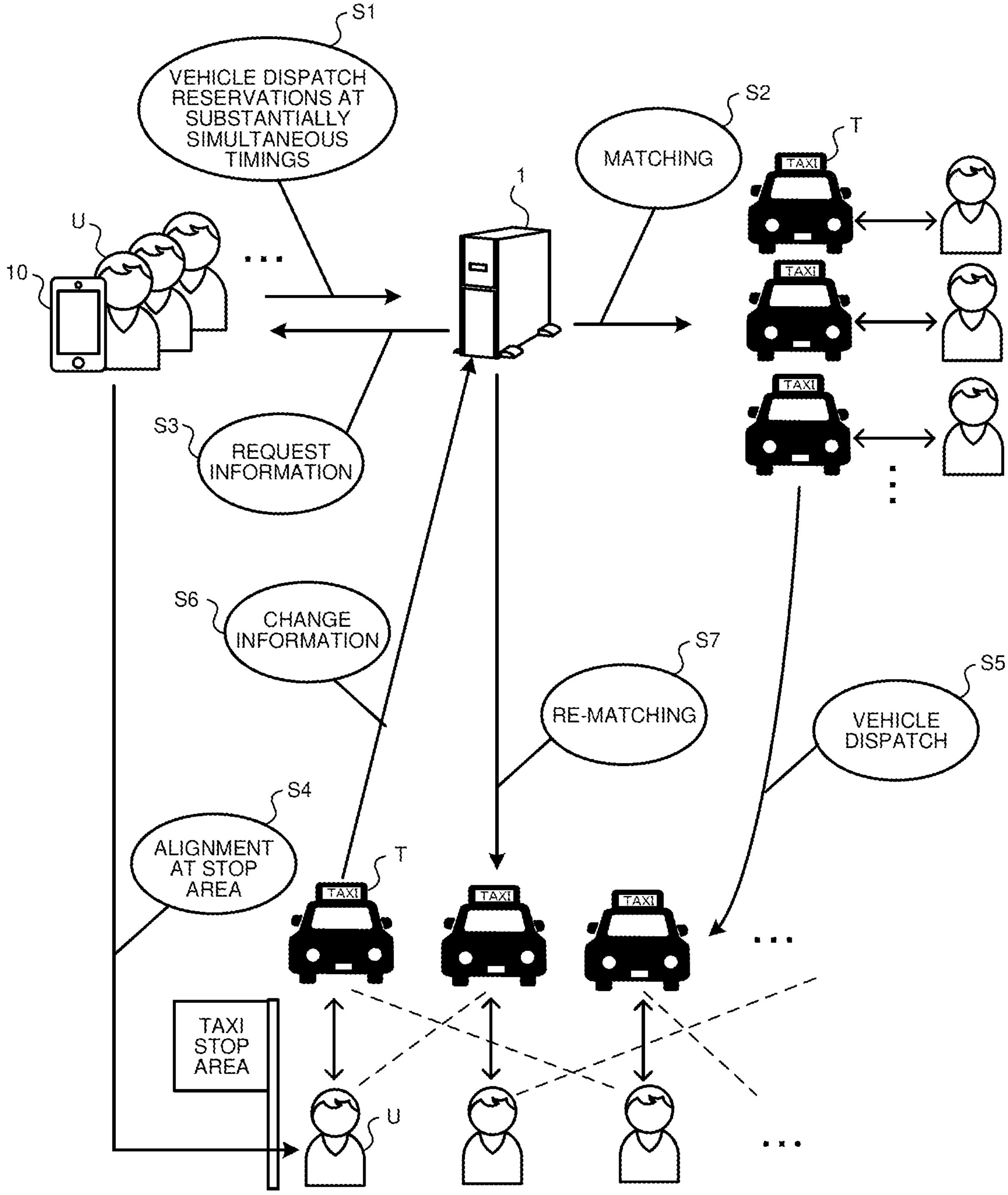
FIG. 1 is an explanatory diagram that illustrates an example of a vehicle dispatch method according to an embodiment.

Hereinafter, an embodiment(s) of a vehicle dispatch device, a vehicle dispatch system, an on-vehicle device, and a vehicle dispatch method will be explained in detail, with reference to the accompanying drawing(s). Additionally, this invention is not limited by an embodiment(s) as illustrated below. FIG. 1 is an explanatory diagram that illustrates an example of a vehicle dispatch method according to an embodiment.

As illustrated in FIG. 1, as a vehicle dispatch device 1 according to an embodiment accepts a vehicle dispatch reservation for a taxi T from a terminal device 10 of a customer U (step S1), it executes matching between a taxi T that accepts the vehicle dispatch reservation and the customer U (step S2). Additionally, in the present embodiment, an explanation will be executed by assuming a case where vehicle dispatch reservations for a taxi are accepted at substantially simultaneous timings (in a situation of reservations where a taxi stop area is crowded) from terminal devices 10 of a plurality of customers U that are present in an identical stop area and/or adjacent points (for example, an event venue, a company with multiple visitors, etc.), for providing a clear explanation.

Then, the vehicle dispatch device 1 transmits, to the terminal devices 10, request information that requests to align in a line in a stop area in order of customers U that arrive at the stop area and take an arriving taxi T sequentially in order from a customer U at a front of the line (step S3). Additionally, in practice, instruction information for a stop area may merely be transmitted to the terminal devices 10. Thereby, a plurality of customers U align in a stop area (step S4).

Subsequently, the vehicle dispatch device 1 notifies an on-vehicle device of a taxi T that accepts a vehicle dispatch reservation of reservation information of a matched customer U so as to dispatch the taxi T to a stop area where the plurality of customers U are present (step S5). Reservation information includes information of a name of a customer, a stop area, and a destination, etc.

Herein, an order of arriving of each customer U at a stop area does not necessarily coincide with an order of arriving of a taxi T that is matched with each customer U at the stop area. Hence, if matching between a customer U and a taxi T remains an original matching, it takes for a driver of a taxi T to find a matched customer U, so that it is not possible for a customer U to take such a vehicle smoothly. FIG. 1 indicates an original matching by a broken line that connects a customer U that arrives at a stop area and a taxi T that arrives thereat.

Hence, the vehicle dispatch device 1 requests customers to align at a stop area and take an arriving taxi T sequentially, as described previously. Additionally, such a request may be displayed on a display device in a taxi stop area where the vehicle dispatch device 1 does not execute such a request. Then, as the vehicle dispatch device 1 receives, from an on-vehicle device of a taxi T that arrives at a stop area, change information that indicates that a customer (a customer without a reservation) that is different from an originally matched customer U takes a vehicle (step S6), it executes re-matching between a customer U and a taxi T (step S7). Additionally, an on-vehicle device that is mounted on a taxi T identifies a customer U based on a content of information communication with a terminal device 10 of the customer U, an operation of a driver, etc., and transmits information of the customer U that takes such a taxi (that is change information in a case where it is different from an originally matched customer U) to the vehicle dispatch device 1.

Hence, while it is possible to cause re-matched customer U to take a taxi T without causing confusion between each taxi and each customer that is caused by violating matching, it is possible for a customer U to take a taxi T that arrives at a stop area without waiting arriving of an originally matched taxi T. Thereby, it is possible for the vehicle dispatch device 1 to cause a plurality of customers U that execute vehicle dispatch reservations at substantially simultaneous timings from an identical stop area and/or adjacent points to take taxis T smoothly.

Figure 2:
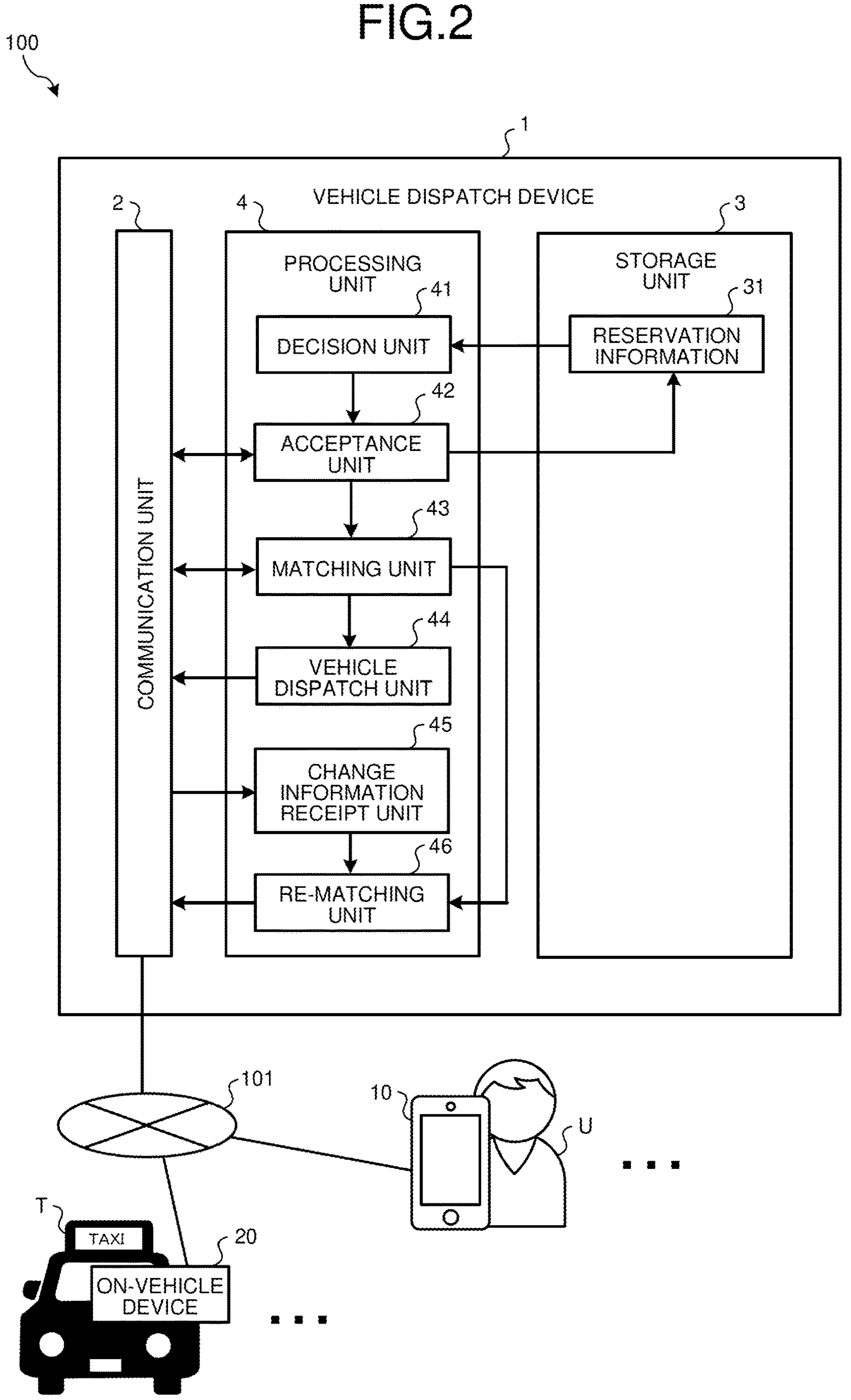
FIG. 2 is a diagram that illustrates a configuration example of a vehicle dispatch system according to an embodiment.

Next, a configuration example of a vehicle dispatch system according to an embodiment will be explained with reference to FIG. 2. FIG. 2 is a diagram that illustrates a configuration example of a vehicle dispatch system according to an embodiment. As illustrated in FIG. 2, a vehicle dispatch system 100 according to an embodiment includes a vehicle dispatch device 1, a terminal device 10 that is carried by a customer U, and an on-vehicle device 20 that is mounted on a taxi T.

The terminal device 10 is, for example, a smartphone. Additionally, the terminal device 10 may be another portable device such as a tablet-type terminal, a notebook personal computer, etc., as long as such a device has a function that is similar to that of a smartphone. An application program that makes the vehicle dispatch system 100 available is installed in the terminal device 10. Furthermore, the terminal device 10 includes a camera function, a two-dimensional bar code reading function, a GPS (Global Positioning System) positioning function, etc., as well as a communication function.

The on-vehicle device 20 includes, an image displaying function, a two-dimensional bar code reading function, a function of executing image recognition of an image that is captured by a dashboard camera that is mounted on a taxi T, a face authentication function that authenticates a face of a person from an image, etc., as well as a communication function. Additionally, a camera that captures an image of a customer U that takes a backseat is mounted on a taxi T. Furthermore, the on-vehicle device 20 includes a customer change detection unit and a change information transmission unit. The customer change detection unit detects that a customer without a reservation other than a customer with a reservation that is target for a vehicle dispatch instruction takes a vehicle. The change information transmission unit transmits change information to the vehicle dispatch device 1, based on taking of a vehicle by a customer without a reservation that is detected by the customer change detection unit.

The vehicle dispatch device 1 is connected to the terminal device 10 and the on-vehicle device 20 so as to be wirelessly communicable therewith through a communication network 101 such as, for example, the Internet. The vehicle dispatch device 1 includes a communication unit 2, a storage unit 3, and a processing unit 4. The communication unit 2 is a communication I/F (interface) that executes transmission/receipt of information between the terminal device 10 and the on-vehicle device 20 and the processing unit 4, through the communication network 101.

The storage unit 3 is an information storage device such as, for example, a data flash, and stores and accumulates therein reservation information 31 that includes a content of a vehicle dispatch reservation. The reservation information 31 includes a name of a customer U, a date of a vehicle dispatch reservation, a place of a vehicle dispatch destination, and a place of a destination of a customer U, etc.

The processing unit 4 includes a microcomputer that has a CPU (Central Processing Unit), a ROM (Read Only Memory), a RAM (Random Access Memory), etc., and/or various types of circuits. The processing unit 4 includes a plurality of processing units that function as a CPU executes a program that is stored in a ROM while a RAM is used as a workspace. As an example, the processing unit 4 includes a decision unit 41, an acceptance unit 42, a matching unit 43, a vehicle dispatch unit 44, a change information receipt unit 45, and a re-matching unit 46.

Additionally, a part or all of the decision unit 41, the acceptance unit 42, the matching unit 43, the vehicle dispatch unit 44, the change information receipt unit 45, and the re-matching unit 46 that are included in the processing unit 4 may be composed of hardware such as an ASIC (Application Specific Integrated Circuit) and/or a FPGA (Field Programmable Gate Array).

The decision unit 41, the acceptance unit 42, the matching unit 43, the vehicle dispatch unit 44, the change information receipt unit 45, and the re-matching unit 46 that are included in the processing unit 4 realize or execute actions of information processing that will be respectively explained below. Additionally, an internal configuration of the processing unit 4 is not limited to a configuration as illustrated in FIG. 2 and may be another configuration as long as such a configuration executes information processing as described later.

The acceptance unit 42 accepts a vehicle dispatch reservation for a taxi T from the terminal device 10 of a customer U. A vehicle dispatch reservation includes a name of a customer U, a current position of a customer, and a destination, etc. Additionally, data for identification of a customer, for example, a customer number, etc., may be provided instead of a name of a customer. In such a case, it is preferable to provide a configuration in such a manner that a vehicle dispatch device has a customer database and thereby obtains needed customer information such as a name from a customer number, etc. The acceptance unit 42 also accepts vehicle dispatch reservations for a taxi T to an identical stop area from terminal devices 10 of a plurality of customers U. The acceptance unit 42 sequentially stores and accumulates the reservation information 31 of accepted vehicle dispatch reservations in the storage unit 3.

The decision unit 41 determines a crowded area where vehicle dispatch reservations are concentrated, based on the reservation information 31 that is accumulated in the storage unit 3, and decides a particular stop area for the crowded area. Then, the decision unit 41 outputs a particular stop area that corresponds to a determined crowded area to the acceptance unit 42. Additionally, the decision unit 41 has a function of analyzing a temporal transition of the reservation information 31, determining a place where concentration of vehicle dispatch reservations occur as a crowded area, for example, one or more times a month, deciding an appropriate particular stop area, and storing it in the storage unit 3 as a particular stop area for the crowded area.

The acceptance unit 42 in a case where a vehicle dispatch reservation is accepted acquires a current position of the terminal device 10 from the terminal device 10 and notifies it of an adjacent and appropriate position for taking a vehicle. Herein, the acceptance unit 42 in a case where a current position of the terminal device 10 is a crowded areas notifies the terminal device 10 of a particular stop area that is adjacent to a current position of the terminal device 10, among particular stop areas that are decided by the decision unit 41.

Thereby, the vehicle dispatch device 1 guides a plurality of customers U that wait taxis T at various positions in a place where vehicle dispatch reservations are concentrated to one particular stop area, so that it is possible to cause a customer U to take a taxi T smoothly.

Herein, the acceptance unit 42 notifies each group of customers U with adjacent destinations of a particular stop area. For example, in a case where an east bound customer U and a westbound customer U are present in an identical crowded area, the acceptance unit 42 notifies the eastbound customer U of a particular stop area that faces an eastbound road and notifies the westbound customer U of a particular stop area that faces a westbound road. Thereby, for example, it is possible for the vehicle dispatch device 1 to reduce a possibility that a customer U takes a taxi T that starts to run in a direction that is opposite to a destination for the customer U, so that it is also possible to reduce a possibility of traffic confusion that is caused by an inefficient U-turn of a taxi T.

Furthermore, the acceptance unit 42 in a case where a vehicle dispatch reservation is accepted transmits, to the terminal device 10, request information that requests to take a taxi T in order of customers that arrive at an identical stop area. Thereby, it is possible for a customer U to take an arriving taxi T immediately without waiting an originally matched taxi T. Therefore, it is possible for the vehicle dispatch device 1 to cause a customer U to take a taxi T smoothly. Additionally, although such request information may be displayed by using a display device in a taxi stop area, displaying (variable display that is executed by a liquid crystal display, etc., where remote display control thereof is executed by the vehicle dispatch device 1) only in a case where such a method is applied (in a corresponding taxi stop area in a case where a crowded area occurs) is more desirable than permanently fixed display that is executed by a guide plate, etc. Then, the acceptance unit 42 outputs accepted vehicle dispatch reservation information to the matching unit 43.

The matching unit 43 seeks a taxi T that accepts a reservation acceptance. For example, the matching unit 43 discloses a stop area and a destination for a customer U to a plurality of taxis T so as to seek a taxi T that accepts a reservation acceptance. A taxi T that desires transportation of a customer transmits a vehicle dispatch desire, together with vehicle information that includes information for vehicle identification and/or vehicle position information, to the matching unit 43. The matching unit 43 executes matching between each taxi that accepts a reservation acceptance and a customer U and decides a taxi T that is dispatched, also in view of various types of vehicle information such as a position and/or a past vehicle dispatch situation of each vehicle. Then, the matching unit 43 outputs a result of matching to the vehicle dispatch unit 44.

The vehicle dispatch unit 44 notifies the on-vehicle device 20 of a taxi T that is decided to be dispatched of the reservation information 31 of a matched customer U so as to dispatch the taxi T to a vehicle taking position where a customer U is notified thereof. Herein, in a case of a reservation from a crowded area, a taxi T is dispatched to a particular stop area.

The change information receipt unit 45 receives, from the on-vehicle device 20 of a taxi T, vehicle tanking information that indicates that a customer with a reservation takes a vehicle. Furthermore, the change information receipt unit 45 in a case where a customer U that is different from a customer U that is matched by the matching unit 43 takes a taxi T receives, from the on-vehicle device 20 of a taxi T that arrives at a particular stop area, change information that indicates that the customer U that is different from a customer U that is matched by the matching unit 43 (a customer without a reservation other than a customer with a reservation) takes a vehicle. Furthermore, in a case where a customer without a vehicle dispatch reservation takes a taxi T, the on-vehicle device 20 switches it to usual taking a cruising vehicle and transmits change information that includes information that indicates switching to taking a cruising vehicle and a result of original matching to the change information receipt unit 45 of the vehicle dispatch device 1.

Change information includes a result of original matching, the reservation information 31 of a customer that currently takes a vehicle (or information that indicates switching to taking a cruising vehicle), etc. The change information receipt unit 45 outputs received change information to the re-matching unit 46.

The re-matching unit 46 in a case where change information is received by the change information receipt unit 45 executes re-matching between another taxi T that is dispatched to an identical particular stop area (that may include another particular stop area for an identical crowded area) and a customer U before taking a vehicle and notifies the on-vehicle device 20 of another taxi T of a result of re-matching. Thereby, new matching is established. Additionally, the re-matching unit 46 in a case where it meets information that indicates switching to taking a cruising vehicle newly seeks a taxi that is dispatched.

Therefore, it is possible for the vehicle dispatch device 1 to cause a customer U to take an arriving taxi T in order of customers U that arrive at a stop area without causing confusion of a customer U and a driver of a taxi T, so that it is possible to cause a plurality of customers U that execute vehicle dispatch reservations at substantially simultaneous timings from an identical event venue, adjacent positions, an identical stop area, etc., to take taxis T smoothly.

Herein, the re-matching unit 46 notifies a customer U that has already taken a taxi T and the on-vehicle device 20 of an originally matched taxi T of reservation information of a customer U that is originally matched with a taxi where a customer U has already taken a vehicle as a result of re-matching.

Thereby, it is possible for a taxi T that is notified of a result of re-matching to cause a re-matched new customer U to take such a vehicle immediately even when an originally matched customer U takes another taxi T. Additionally, the vehicle dispatch system 100 may have a function of compensating for a difference in price, for a taxi T where a running distance is reduced relative to a case of original matching by re-matching so as to decrease a fare. For example, fare information of each taxi with a change (taxis with mutually associated changes) is collected and a predetermined rate (for example, a half) of a difference in price between a fare for vehicle dispatch before a change and a fare for vehicle dispatch after the change is adjusted (a decrease in price in a case where a fare is increased after a change or an increase in price in a case where a fare is decreased after a change) so as to be reflected on a fare adjustment system.

Furthermore, the re-matching unit 46 may notify the on-vehicle device 20 of a taxi T that is originally matched with a customer U that has already taken a taxi T of a customer U that is not matched with a taxi T and stays in an identical stop area (a particular stop area notified of). In such a case, the re-matching unit 46 preferentially executes re-matching for a taxi T that is adjacent to such a stop area. Thereby, the re-matching unit 46 attains matching with an appropriate taxi T, so that, for example, it is possible to reduce a possibility that re-matching is executed repeatedly and inefficiently for a taxi that is distant from a stop area.

Figure 3:
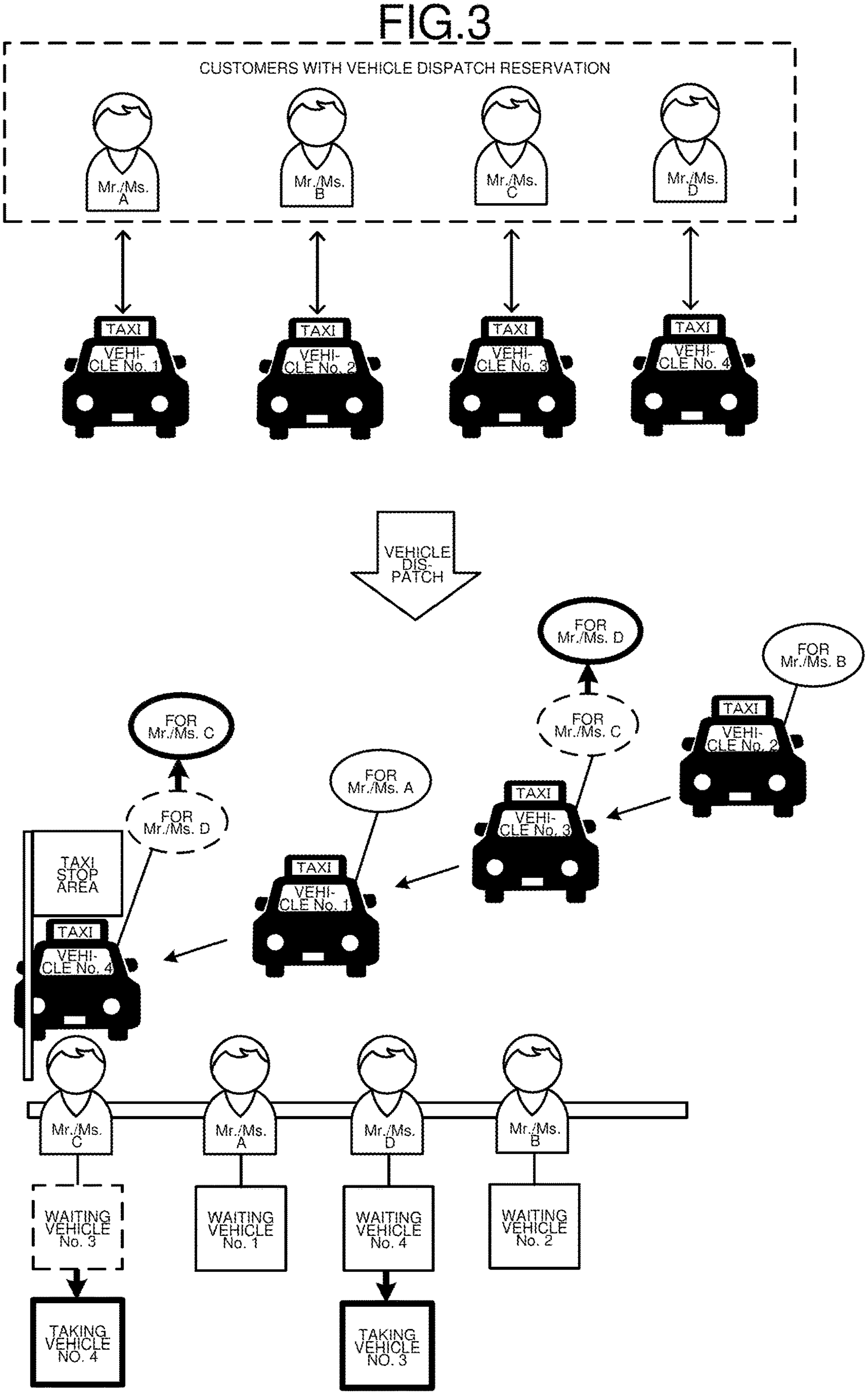
FIG. 3 is a diagram that illustrates a specific example of re-matching according to an embodiment.

Next, a specific example of re-matching will be explained with reference to FIG. 3. FIG. 3 is a diagram that illustrates a specific example of re-matching according to an embodiment. Herein, a case will be explained where matching is executed between Mr./Ms. A, Mr./Ms. B, Mr./Ms. C, and Mr./Ms. D as customers with a vehicle dispatch reservation and taxis with vehicle No. 1 to vehicle No. 4.

As illustrated in FIG. 3, the vehicle dispatch device 1 executes matching between Mr./Ms. A and vehicle No. 1, between Mr./Ms. B and vehicle No. 2, between Mr./Ms. C and vehicle No. 3, and between Mr./Ms. D and vehicle No. 4, for example, at a time of acceptance of vehicle dispatch reservations, and executes dispatches such vehicles. A case is assumed where, subsequently, Mr./Ms. C, Mr./Ms. A, Mr./Ms. D, and Mr./Ms. B arrive at a stop area in order and vehicle No. 4, vehicle No. 1, vehicle No. 3, and vehicle No. 2 arrive at the stop area in order.

Mr./Ms. C takes a first arriving vehicle No. 4. Mr./Ms. C waits vehicle No. 3 in original matching. Hence, it is not possible to cause an originally matched Mr./Ms. C to take vehicle No. 3. Furthermore, vehicle No. 4 is originally provided for Mr./Ms. D. Hence, it is not possible for Mr./Ms. D to take vehicle No. 4.

Herein, the vehicle dispatch device 1 executes re-matching between vehicle No. 4 and Mr./Ms. C so as to provide vehicle No. 4 for Mr./Ms. C. Then, the vehicle dispatch device 1 executes re-matching between vehicle No. 3 and Mr./Ms. D so as to provide vehicle No. 3 for Mr./Ms. D. As a result, Mr./Ms. D is changed from waiting vehicle No. 4 to waiting vehicle No. 3.

It is possible for Mr./Ms. A to take vehicle No. 1 according to original matching. It is also possible for Mr./Ms. B to take vehicle No. 2 according to original matching. Thus, pairs of Mr./Ms. C and vehicle No. 4, Mr./Ms. A and vehicle No. 1, Mr./Ms. D and vehicle No. 3, and Mr./Ms. B and vehicle No. 2 are provided by re-matching. Thereby, it is possible for the vehicle dispatch device 1 to cause taking a taxi T smoothly without causing Mr./Ms. A, Mr./Ms. B, Mr./Ms. C, and Mr./Ms. D to wait and also without causing vehicle No. 1, vehicle No. 2, vehicle No. 3, and vehicle No. 4 to change an order of arrival thereof or search a customer near a stop area.

Figure 4:
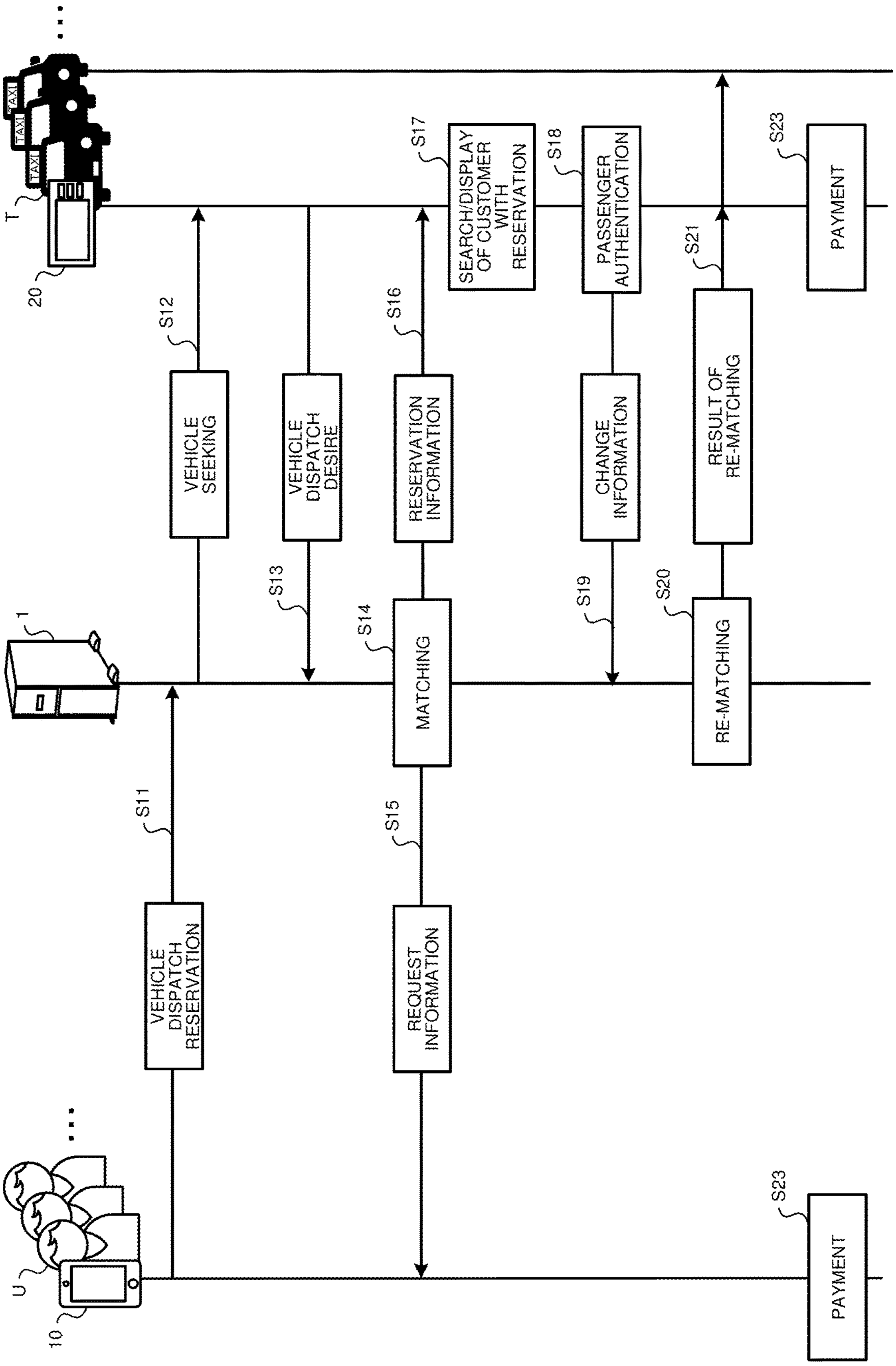
FIG. 4 is a sequence diagram that illustrates an operation example of a vehicle dispatch system according to an embodiment.

Next, an operation of a vehicle dispatch system according to an embodiment will be explained with reference to FIG. 4. FIG. 4 is a sequence diagram that illustrates an operation example of a vehicle dispatch system according to an embodiment. As illustrated in FIG. 4, as a customer U executes an operation for vehicle dispatch reservation by a terminal device 10, the terminal device 10 transmits vehicle dispatch reservation information to a vehicle dispatch device 1. Then, the vehicle dispatch device 1 first accepts vehicle dispatch reservation information from the terminal device 10 of a customer U (step S11).

Subsequently, the vehicle dispatch device 1 transmits vehicle seeking information for a taxi T that accepts a vehicle dispatch reservation to an on-vehicle device 20. Then, the on-vehicle device 20 receives such vehicle seeking information and displays information that is needed for a driver on a display (step S12). As a driver that desires vehicle dispatch executes an operation for a vehicle dispatch desire on the on-vehicle device 20 based on vehicle seeking information that is displayed on a display, the on-vehicle device 20 transmits vehicle dispatch desire information to the vehicle dispatch device 1. Then, the vehicle dispatch device 1 receives a vehicle dispatch desire from the on-vehicle device 20 of a taxi T that accepts a vehicle dispatch reservation (step S13). Subsequently, the vehicle dispatch device 1 executes matching between a customer U and a taxi based on vehicle dispatch reservation information, positional information that is included in vehicle dispatch desire information, various types of desire information of a customer, a vehicle dispatch history of a taxi, etc. (step S14).

Then, the vehicle dispatch device 1 transmits request information such as an instruction for a taxi stop area (position) and/or information of a taxi that is dispatched, etc., to the terminal device 10 of a corresponding customer U (step S15). Then, the terminal device 10 of a customer U receives request information and displays request information that is needed for a customer U on a display. Furthermore, the vehicle dispatch device 1 transmits reservation information 31 to the on-vehicle device 20 (step S16). Then, the on-vehicle device 20 receives such reservation information 31 and displays information that is needed for a driver on a display. As a taxi T approaches a stop area (where current position data that are detected by a position detection device such as a GPS that is mounted on the on-vehicle device 20 and vehicle dispatch position (taxi stop area position) data that are included in reservation information are compared), the on-vehicle device 20 searches a customer with a reservation by using an image recognition process for a camera image, etc., and the on-vehicle device 20 displays the customer with a reservation (step S17). Additionally, a specific example of step S17 will be described later, with reference to FIG. 8 to FIG. 11. Furthermore, a method for searching of a customer with a reservation may be executed by a visual observation of a driver so as to input a result thereof to the on-vehicle device 20.

Subsequently, as a customer U takes a taxi T, the on-vehicle device 20 executes passenger authentication (step S18). A specific example of step S18 will be described later with reference to FIG. 5 to FIG. 7, FIG. 12, and FIG. 13. Additionally, a method for authentication of a customer with a reservation may be executed by a visual observation of a driver, etc., so as to input a result thereof to the on-vehicle device 20. The on-vehicle device 20 in a case where it is determined at step S18 that a customer U that takes a vehicle is not an originally matched customer U transmits occupied vehicle information (customer taking vehicle information) that includes change information to the vehicle dispatch device 1 (step S19). Additionally, the on-vehicle device 20 in a case where it is determined at step S18 that a customer U that takes a vehicle is an originally matched customer U transmits occupied vehicle information that includes information of no customer change to the vehicle dispatch device 1. Then, the vehicle dispatch device 1 receives occupied vehicle information and determines that vehicle dispatch to a customer U is completed, so as to execute a vehicle dispatch completion process (data recording, deletion of a display of customer waiting, etc.) for a customer U.

The vehicle dispatch device 1 in a case where change information is received executes re-matching (step S20) and transmits a result of re-matching to the on-vehicle device 20 that transmits the change information thereto and the on-vehicle device 20 of another taxi T that needs such information (mainly, a newly matched taxi) (step S21). Subsequently, the on-vehicle device 20 that transmits the change information thereto continues a service trip process and transfers a process to step S23. Additionally, the on-vehicle device 20 of a newly matched taxi moves to a pick-up process for a customer with a reservation, that is, a process at step S17.

Furthermore, the on-vehicle device 20 in a case where it is determined at step S18 that a customer U that takes a vehicle is an originally matched customer U continues a service trip process and transfers a process to step S23. Subsequently, as a taxi T arrives at a destination of a customer U, the on-vehicle device 20 and the terminal device 10 execute payment (step S23). Furthermore, the on-vehicle device 20 transmits empty vehicle information that includes information of being an empty vehicle and information regarding a last occupied vehicle (an occupied vehicle running distance, a fare, etc.) to the vehicle dispatch device 1. Then, the vehicle dispatch device 1 receives such empty vehicle information and executes a process such as recording of needed information and a change of state data of a corresponding taxi (that is provided as an empty vehicle so as provide a vehicle dispatch target vehicle), so that a series of operations of a vehicle dispatch system 100 is ended.

Figure 5:
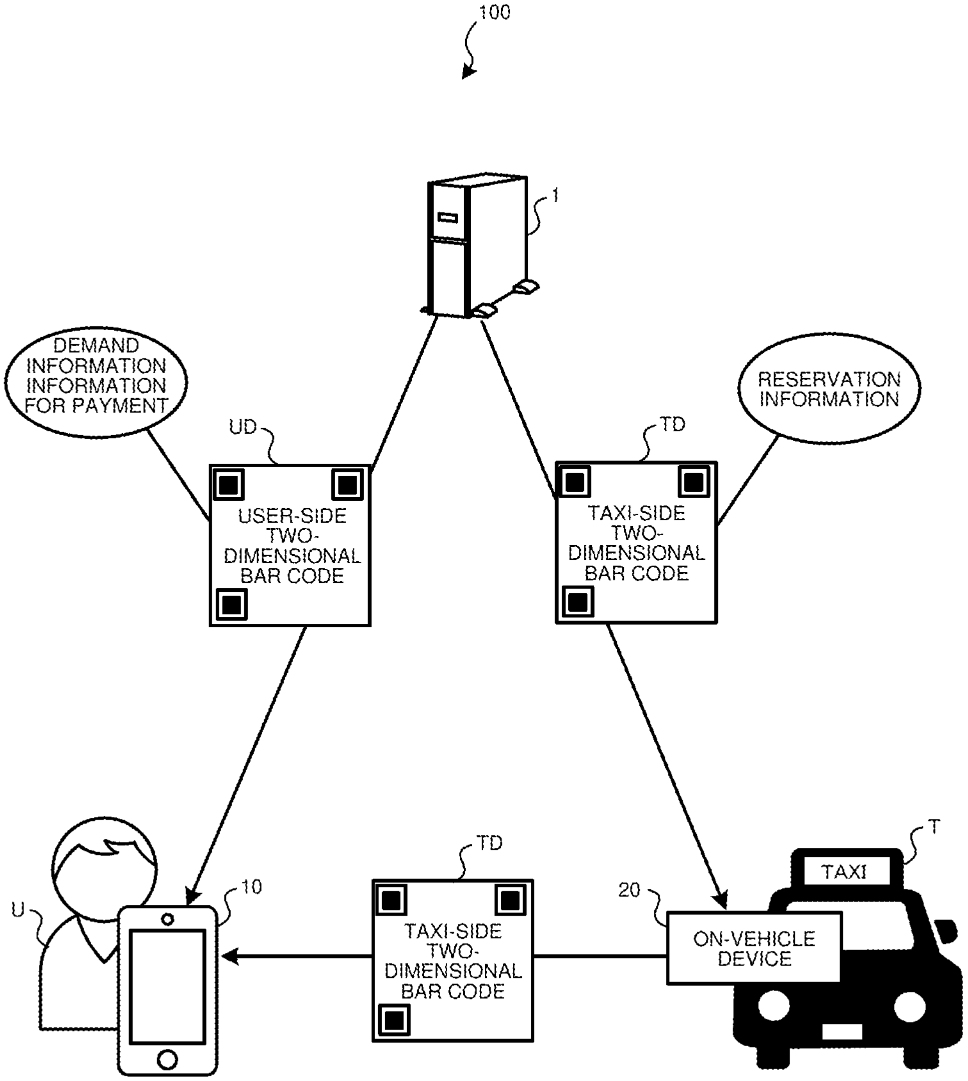
FIG. 5 is a diagram that illustrates a system operation example that uses a two-dimensional bar code according to an embodiment.
Figure 6:
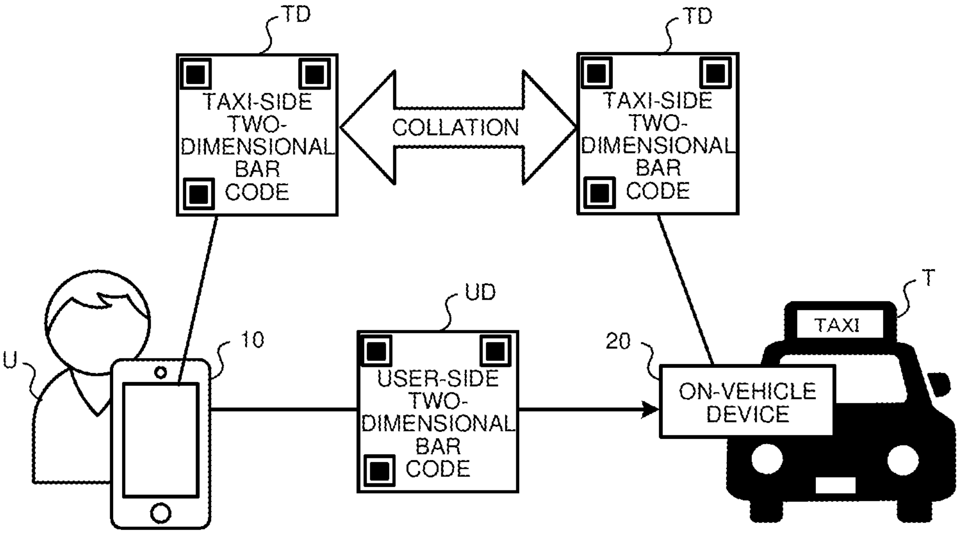
FIG. 6 is a diagram that illustrates a system operation example that uses a two-dimensional bar code according to an embodiment.
Figure 7:
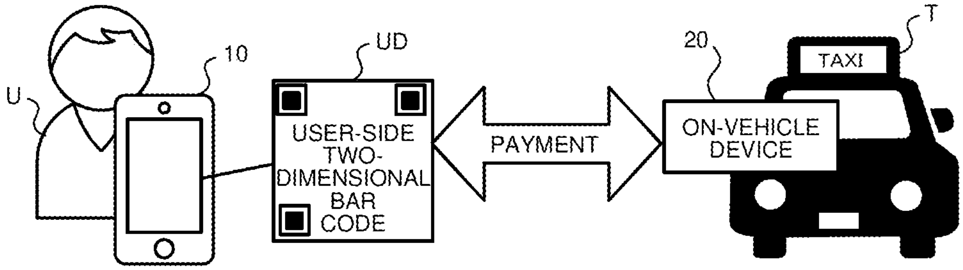
FIG. 7 is a diagram that illustrates a system operation example that uses a two-dimensional bar code according to an embodiment.

Next, a system operation example that uses a two-dimensional code according to an embodiment will be explained with reference to FIG. 5 to FIG. 7. FIG. 5 to FIG. 7 are diagrams that illustrate a system operation example that uses a two-dimensional code according to an embodiment.

As illustrated in FIG. 5, in a vehicle dispatch system 100, an acceptance unit 42 of a vehicle dispatch device 1 in a case where a vehicle dispatch reservation is accepted transmits a taxi-side two-dimensional bar code TD to an on-vehicle device 20 and transmits a user-side two-dimensional bar code UD to a terminal device 10.

A taxi-side two-dimensional bar code TD includes reservation information 31. A user-side two-dimensional bar code UD includes demand information and information for payment. Information for payment is information that includes a payment method for a fare, a type of electronic money that is used for payment, etc. Demand information is information that includes a demand for a taxi T that is input by a customer U at a time of a vehicle dispatch reservation. For example, demand information includes information of a preferred drive, a desired road, OK/NG of conversation, hurry/no hurry, etc. As the on-vehicle device 20 receives a taxi-side two-dimensional bar code TD, it transmits the taxi-side two-dimensional bar code TD to the terminal device 10. Additionally, it is possible to realize such transmission by a method that executes transmission through the vehicle dispatch device 1, a method that executes transmission by an on-vehicle device based on terminal information (a contact address) of a customer U that is included in the reservation information 31, etc.

Subsequently, as illustrated in FIG. 6, the on-vehicle device 20 in a case where a customer U takes a taxi T causes the terminal device 10 to display a taxi-side two-dimensional bar code TD that is transmitted previously, reads it by a camera, and collates it with a taxi-side two-dimensional bar code TD that is transmitted from the vehicle dispatch device 1 so as to confirm a customer U. Thereby, it is possible for the on-vehicle device 20 to confirm whether or not it is a matched customer U, without causing a trouble to a driver of a taxi T and a customer U. Additionally, in a case where a customer U that takes a vehicle is a matched customer U, occupied vehicle information that includes information of no customer change is transmitted to the vehicle dispatch device 1. Furthermore, in a case where a customer U that takes a vehicle is not a matched customer U, occupied vehicle information (customer taking vehicle information) that includes change information is transmitted to the vehicle dispatch device 1. That is, such a method that utilizes a two-dimensional bar bode TD as illustrated in FIG. 5 is used for processes at steps S18 and S19 in FIG. 4, so that it is possible to simplify operations of a driver and a customer and it is possible to realize a vehicle dispatch system preferably.

Furthermore, the on-vehicle device 20 reads a user-side two-dimensional bar code UD from the terminal device 10 and displays demand information on, for example, a display 21 of the on-vehicle device 20. Thereby, it is possible for a driver of taxi T to execute driving according to a demand of a customer U.

Subsequently, as illustrated in FIG. 7, as a destination for a customer U is arrived at, the on-vehicle device 20 reads a user-side two-dimensional bar code UD and executes payment of a fare. Thereby, it is possible for the on-vehicle device 20 to complete payment without causing a trouble to a driver of a taxi T and a customer U.

Additionally, a taxi-side two-dimensional bar code TD may include a code for payment. In such a case, it is also possible for the terminal device 10 to read a code for payment from a taxi-side two-dimensional bar code TD and execute payment.

Furthermore, a user-side two-dimensional bar code UD may include the reservation information 31. In such a case, the terminal device 10 may transmit a user-side two-dimensional bar code UD that includes the reservation information 31, demand information, and payment information to the on-vehicle device 20 at a time of a reservation.

Thereby, it is possible for the on-vehicle device 20 to confirm whether or not it is a matched customer U without causing a trouble to a driver of a taxi T and a customer U, so that it is possible to complete payment. Furthermore, it is possible for a driver of a taxi T to execute driving according to a demand of a customer U.

Next, a system operation example that uses photograph information according to an embodiment will be explained with reference to FIG. 8 to FIG. 13. FIG. 8 to FIG. 13 are diagrams that illustrate a system operation example that uses photograph information according to an embodiment.

Figure 8:
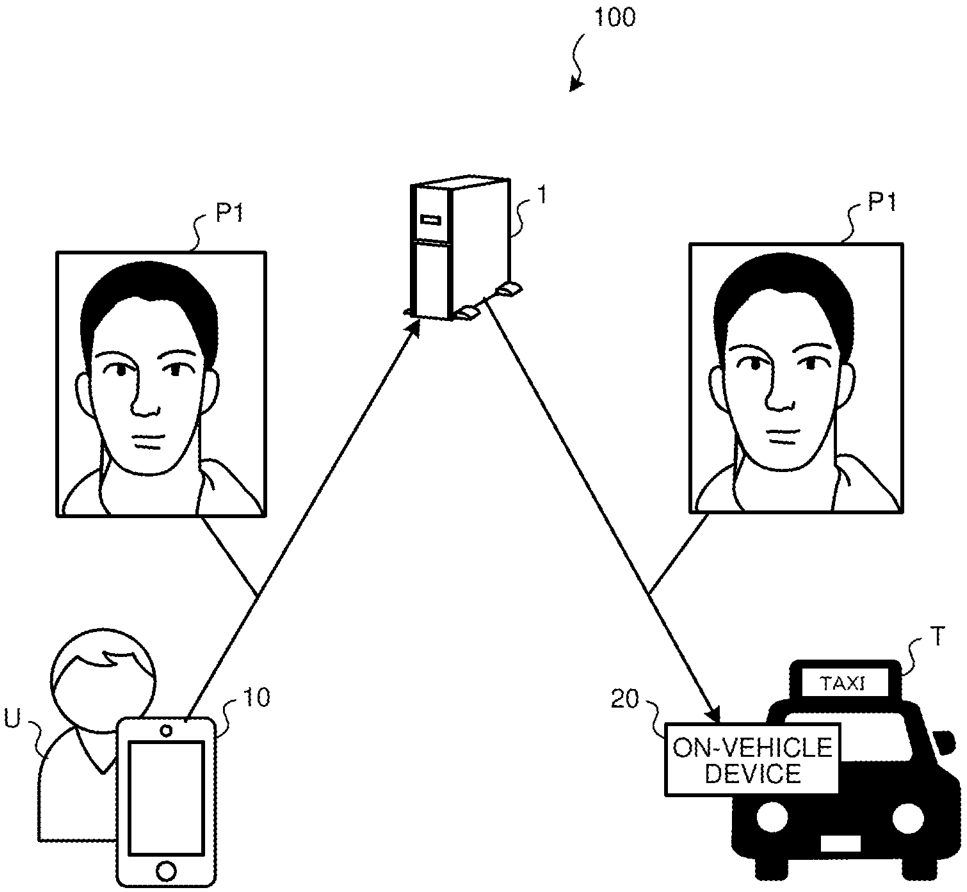
FIG. 8 is a diagram that illustrates a system operation example that uses photograph information according to an embodiment.

As illustrated in FIG. 8, in a vehicle dispatch system 100, a terminal device 10 in a case where a vehicle dispatch reservation is executed transmits photograph information P1 where an image of a face of a customer U is captured to a vehicle dispatch device 1. An acceptance unit 42 of the vehicle dispatch device 1 accepts a vehicle dispatch reservation and acquires photograph information P1 where an image of a face of a customer U is captured from the terminal device 10 of the customer U. A vehicle dispatch unit 44 notifies an on-vehicle device 20 of reservation information 31 of a customer U that includes photograph information of the customer U.

Figure 9:
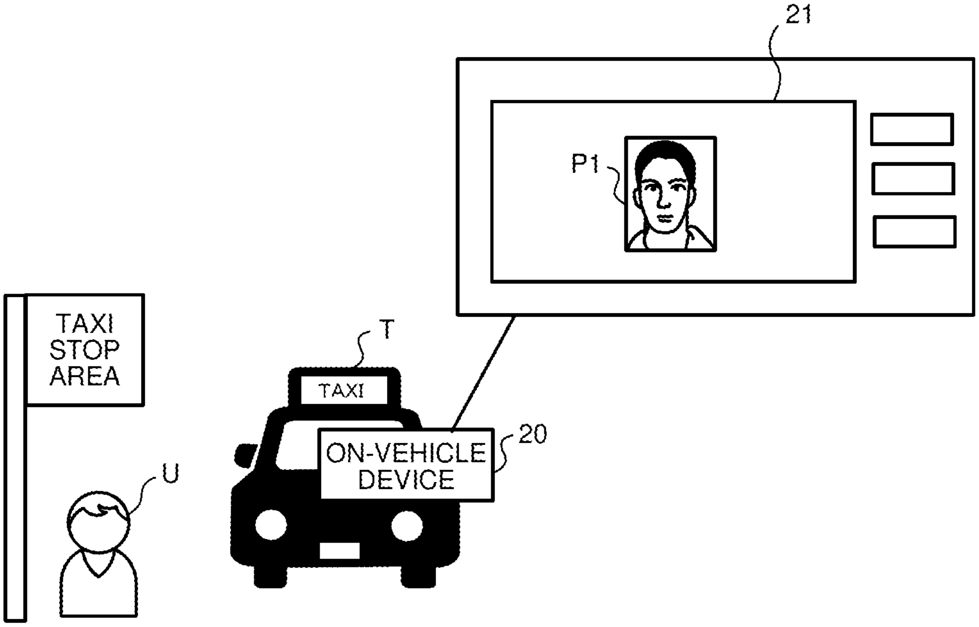
FIG. 9 is a diagram that illustrates a system operation example that uses photograph information according to an embodiment.

The on-vehicle device 20 receives the reservation information 31 from the terminal device 10 and uses photograph information P1 that is included in the reservation information 31 as a material for searching a customer U for a driver of a taxi T. For example, as illustrated in FIG. 9, as it approaches a stop area, the on-vehicle device 20 automatically displays photograph information P1 on a display 21. Thereby, a driver of a taxi T confirms photograph information P1 that is displayed on the display 21, so that it is possible to readily find a customer U that is present in a stop area.

Figure 10:
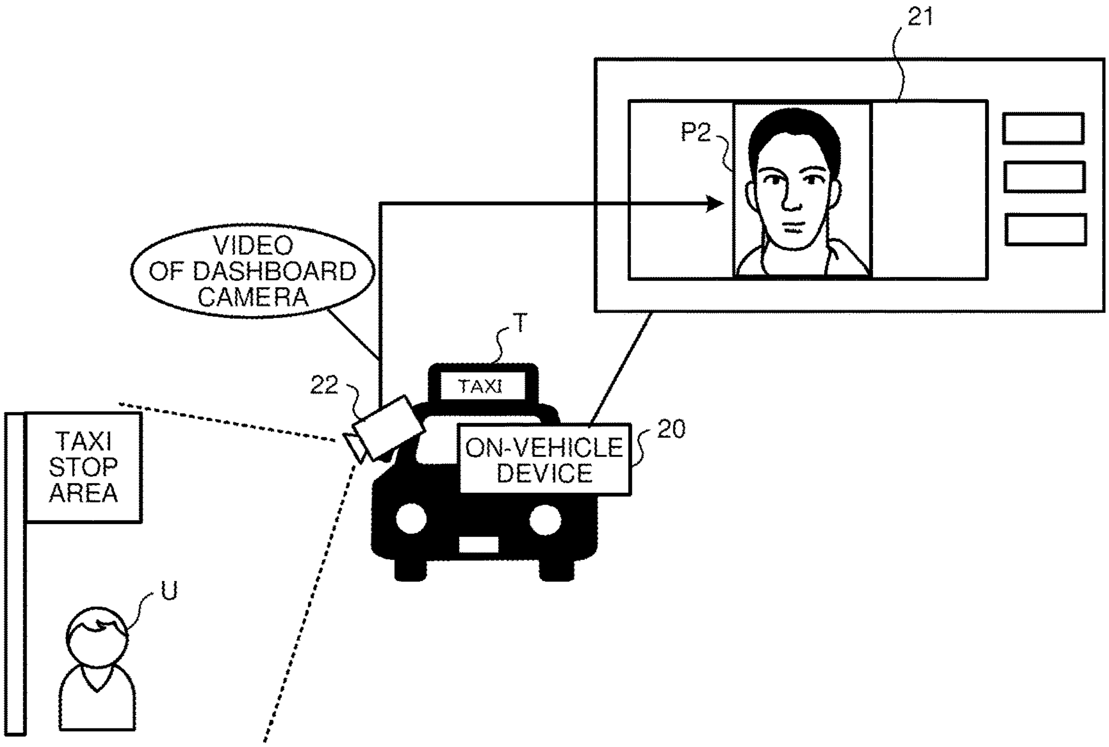
FIG. 10 is a diagram that illustrates a system operation example that uses photograph information according to an embodiment.

Furthermore, as illustrated in FIG. 10, the on-vehicle device 20 executes an image recognition process by using a video of a periphery of a vehicle that is captured by a camera of a dashboard camera 22, so that it is also possible to enlarge or emphasize and display, on the display 21, photograph information P2 of a customer U that is specified by a feature point such as a face and a cloth of the customer U that is included in photograph information P1. Thereby, a driver of a taxi T confirms photograph information P2 that is displayed on the display 21, so that it is possible to readily find a customer U that is present in a stop area.

Figure 11:
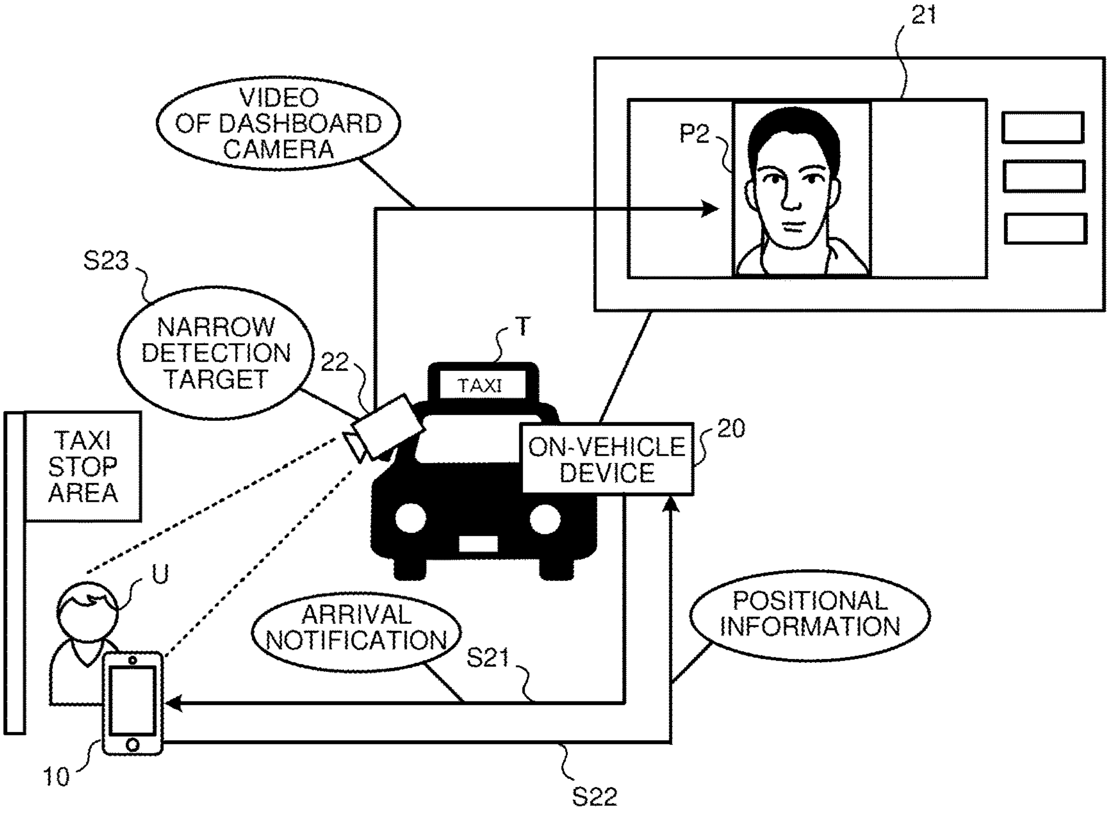
FIG. 11 is a diagram that illustrates a system operation example that uses photograph information according to an embodiment.

Furthermore, as illustrated in FIG. 11, in a case where it arrives at a stop area, it is possible for the on-vehicle device 20 to transmit arriving notification to the terminal device 10 (step S21). As the terminal device 10 receives arriving notification, it transmits positional information of a customer U where positioning thereof is executed by a GPS to the on-vehicle device 20 (step S22).

The on-vehicle device 20 narrows a detection target from a video of the dashboard camera 22 to some extent based on positional information of a customer U (step S23), further executes an image recognition process, and enlarges or emphasizes and displays photograph information P2 of a specified customer U on the display 21. Thereby, it is possible for a driver to detect a customer U for a shorter time, based on display that is executed by the on-vehicle device 20.

Additionally, every time a vehicle dispatch reservation is executed by an application program from a viewpoint of personal information protection, a vehicle dispatch system 100 confirms whether transmitting of customer information to a taxi T is permitted, transmits the customer information to only in a case where permission is obtained, and automatically deletes the customer information as taking of a vehicle is completed.

Figure 12:
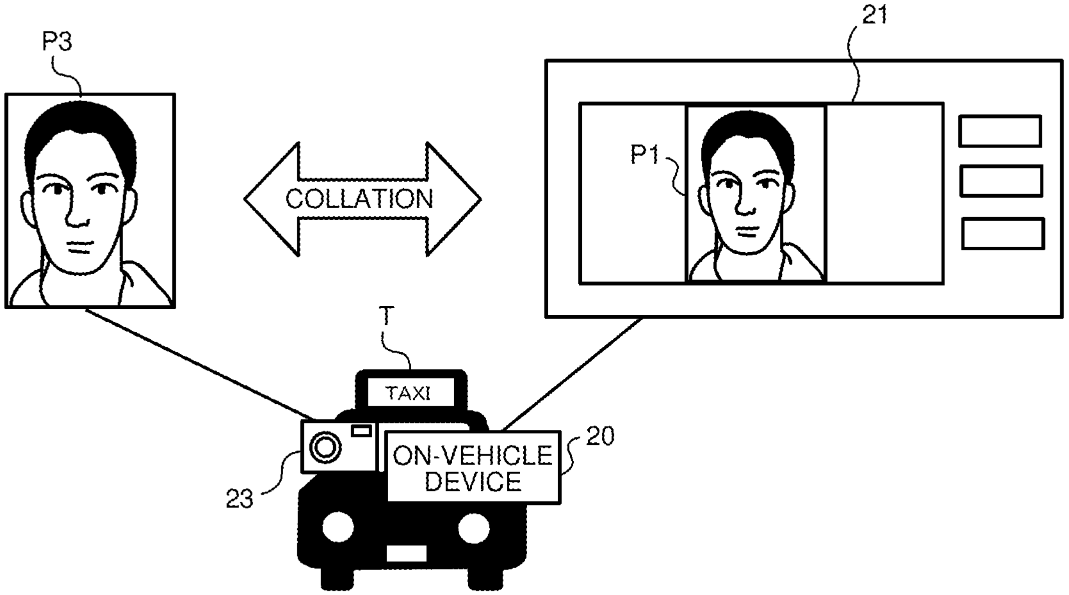
FIG. 12 is a diagram that illustrates a system operation example that uses photograph information according to an embodiment.

Then, as illustrated in FIG. 12, as a customer U takes a taxi T, the on-vehicle device 20 collates an image P3 of a camera 23 of a dashboard camera that is captured by a customer U that takes a backseat with photograph information P1 of a customer U that is preliminarily received from the vehicle dispatch device 1 so as to confirm whether or not it is a customer U that executes a vehicle dispatch reservation. Thereby, it is possible to prevent another customer to take a reserved taxi T. Additionally, in a case where a customer U that takes a vehicle is a matched customer U, occupied vehicle information that includes information of no customer change is transmitted to the vehicle dispatch device 1.

Furthermore, in a case where a customer U that takes a vehicle is not a matched customer U, occupied vehicle information (customer taking vehicle information) that includes change information is transmitted to the vehicle dispatch device 1. That is, a customer recognition method that uses an image that is captured by a camera of a dashboard camera, etc., is used, so that it is possible to simplify operations of a driver and a customer and it is possible to realize a vehicle dispatch system preferably.

Furthermore, it is also possible for the on-vehicle device 20 to further acquire information of a cloth, etc., of a customer U from the terminal device 10 at a time of a vehicle dispatch reservation and display it on the display 21, etc. Thereby, confirmation of a customer U that is executed by a driver of a taxi T is also facilitated.

Furthermore, in the vehicle dispatch system 100, if photograph information P1 of a customer U is transmitted from the terminal device 10 at every vehicle dispatch reservation, a communication fee and/or a processing load of the terminal device 10 is/are increased. Hence, in the vehicle dispatch system 100, it is also possible to register photograph information P1 of a customer U preliminarily from an application program of the terminal device 10.

However, in the vehicle dispatch system 100, in a case where a customer U utilizes the vehicle dispatch system 100 over a long period of time, photograph information P1 has to be updated in view of a secular change. However, such an update operation applies a load on a customer U.

Figure 13:
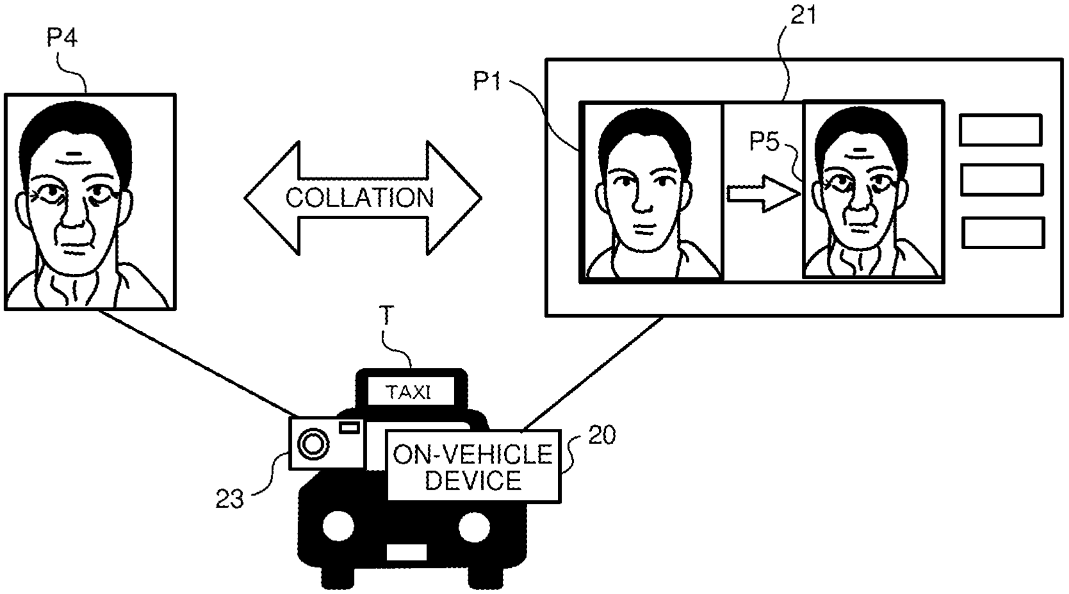
FIG. 13 is a diagram that illustrates a system operation example that uses photograph information according to an embodiment.

Hence, the on-vehicle device 20 includes a face image generation function in view of a secular change. Then, as illustrated in FIG. 13, the on-vehicle device 20 in a case where a customer U takes a vehicle where a long period of time passes after photograph information P1 thereof is registered collates an image P4 of the camera 23 with photograph information P5 that is generated in view of a secular change from the photograph information P1 so as to confirm whether or not it is a customer U that executes a vehicle dispatch reservation. Thereby, it is possible for the vehicle dispatch system 100 to reduce a load of periodic updating of photograph information P1 on a customer U. Additionally, it is possible to realize photograph information P5 that is generated in view of a secular change from photograph information P1 by utilizing an aging degradation process, etc., that are executed by deep learning that uses an artificial intelligence and based on an elapsed time from a timing of image capturing of the photograph information P1.

APPENDIX

Appendix (1) is a vehicle dispatch device, including a change information receipt unit that receives change information that indicates that a customer without a reservation other than a customer with a reservation takes a taxi that is instructed to be dispatched to the customer with a reservation, and a re-matching unit that, in a case where the change information is received by the change information receipt unit, executes re-matching between the customer with a reservation and a taxi and executes notification of a vehicle dispatch instruction to a taxi that is based on a result of re-matching.

Appendix (2) is the vehicle dispatch device according to Appendix (1), wherein the re-matching unit notifies an on-vehicle device of a taxi that is originally matched with the customer without a reservation of reservation information of the customer with a reservation that is originally matched with a taxi that is taken by the customer without a reservation as the result of re-matching.

Appendix (3) is the vehicle dispatch device according to Appendix (1), wherein the re-matching unit notifies an on-vehicle device of a taxi that is originally matched with the customer without a reservation that the customer with a reservation that is not matched with a taxi stays in a vehicle dispatch destination that is based on reservation information of the customer with a reservation.

Appendix (4) is the vehicle dispatch device according to any one of Appendices (1) to (3), including an acceptance unit that accepts a vehicle dispatch reservation, wherein, in a case where vehicle dispatch to an identical stop area is executed for a plurality of customers with a reservation, request information that requests to take a taxi in order of customers that arrive at the identical stop area is transmitted to terminal devise of customers with a reservation.

Appendix (5) is the vehicle dispatch device according to Appendix (4), including a storage unit that stores and accumulates reservation information of a customer with a reservation, and a decision unit that decides a particular stop area for an area where vehicle dispatch reservations are concentrated, based on reservation information that is stored in the storage unit, wherein the acceptance unit in a case where a vehicle dispatch reservation is accepted acquires a current position of a terminal device of a customer with a reservation that executes the vehicle dispatch reservation from the terminal device of a customer with a reservation, and notifies the terminal device of a customer with a reservation of a particular stop area that is selected based on the current position, from the particular stop area that is decided by the decision unit.

Appendix (6) is the vehicle dispatch device according to Appendix (5), wherein the acceptance unit selects the particular stop area where the terminal device of a customer with a reservation is notified thereof, in view of a destination that is included in reservation information of a customer with a reservation.

Appendix (7) is the vehicle dispatch device according to any one of Appendices (4) to (6), wherein the acceptance unit in a case where a vehicle dispatch reservation is accepted transmits, to an on-vehicle device of a taxi that is instructed to be dispatched to a customer with a reservation, a two-dimensional code that is used for a process that determines whether or not a customer that takes the taxi is a customer with a reservation that executes a vehicle dispatch reservation for the taxi.

Appendix (8) is the vehicle dispatch device according to any one of Appendices (4) to (6), wherein the acceptance unit in a case where a vehicle dispatch reservation is accepted transmits, to an on-vehicle device of a taxi that is instructed to be dispatched to a customer with a reservation, photograph information of a customer with a reservation that is used for a process that determines whether or not a customer that takes the taxi is the customer with a reservation that executes a vehicle dispatch reservation for the taxi.

Appendix (9) is a vehicle dispatch system, including a vehicle dispatch device that includes a vehicle dispatch instruction unit that executes an vehicle dispatch instruction based on reservation information from a customer with a reservation, a change information receipt unit that receives change information that indicates that a customer without a reservation other than a customer with a reservation takes a taxi that is instructed to be dispatched to the customer with a reservation, and a re-matching unit that, in a case where the change information is received by the change information receipt unit, executes re-matching between the customer with a reservation and a taxi and executes notification of a vehicle dispatch instruction to a taxi that is based on a result of re-matching, a terminal device that transmits reservation information for a taxi to the vehicle dispatch device based on an operation of a customer with a reservation for a taxi, and an on-vehicle device that includes a customer change detection unit that detects that a customer without a reservation other than a customer with a reservation that is a target for a vehicle dispatch instruction takes a vehicle, and a change information transmission unit that transmits change information based on taking of a vehicle by a customer without a reservation that is detected by the customer change detection unit.

Appendix (10) is an on-vehicle device, including a customer change detection unit that detects that a customer without a reservation other than a customer with a reservation that is a target for a vehicle dispatch instruction takes a vehicle, and a change information transmission unit that transmits change information based on taking of a vehicle by a customer without a reservation that is detected by the customer change detection unit. Appendix (10) may be an on-vehicle device, including a processing unit that is configured to detect that a customer without a reservation other than a customer with a reservation that is a target for a vehicle dispatch instruction takes a vehicle, and transmit change information based on the detected taking of a vehicle by a customer without a reservation.

Appendix (11) is a vehicle dispatch method, including a change information receipt step that receives change information that indicates that a customer without a reservation other than a customer with a reservation takes a taxi that is instructed to be dispatched to the customer with a reservation, and a re-matching step that, in a case where the change information is received by the change information receipt step, executes re-matching between the customer with a reservation and a taxi and executes notification of a vehicle dispatch instruction to a taxi that is based on a result of re-matching.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST

100 vehicle dispatch system
101 communication network
1 vehicle dispatch device
2 communication unit
3 storage unit
31 reservation information
4 processing unit
41 decision unit
42 acceptance unit
43 matching unit
44 vehicle dispatch unit
45 change information receipt unit
46 re-matching unit
10 terminal device
20 on-vehicle device
21 display
22 dashboard camera
23 camera
U customer
T taxi

The invention claimed is:

1. A vehicle dispatch system, comprising:
a vehicle dispatch device, comprising a processor configured to:
store, in a memory, reservation information where a first taxi has been assigned to a first customer with a reservation and a second taxi that is different from the first taxi has been assigned to a second customer with a reservation that is different from the first customer with the reservation;
when being notified, by the first taxi, that the first taxi has been taken by the second customer with the reservation, reassign the second taxi to the first customer with the reservation and update the reservation information stored in the memory; and
notify the second taxi of the updated reservation information,
wherein the vehicle dispatch system further comprises an on-vehicle device that is mounted on the first taxi and transmits, to the vehicle dispatch device, information that indicates that the second customer with the reservation takes the first taxi.

2. The vehicle dispatch system according to claim 1, wherein
the reservation information of the first customer with the reservation includes information that indicates that the first customer with the reservation stays in a first taxi stop area where the first customer with the reservation is scheduled to take the first taxi.

3. The vehicle dispatch system according to claim 1, wherein:
the reservation information of the first customer with the reservation includes information concerning a first taxi stop area where the first customer with the reservation is scheduled to take the first taxi;
the reservation information of the second customer with the reservation includes information concerning a second taxi stop area where the second customer with the reservation is scheduled to take the second taxi, and
the processor is further configured to transmit, in a case where the first taxi stop area and the second taxi stop area are an identical taxi stop area, to the first customer with the reservation and the second customer with the reservation, request information that requests to take the first taxi and the second taxi in order of arrival of the first taxi and the second taxi at the identical taxi stop area.

4. The vehicle dispatch system according to claim 3, wherein
the processor is further configured to:
decide, in a case where it is determined that the first taxi stop area is included in an area where reservations for a plurality of taxis that include the first taxi are concentrated, based on reservation information of a plurality of customers with a reservation that includes the reservation information of the first customer with the reservation, a plurality of particular taxi stop areas that are included in the area, and
notify a terminal device of the first customer with the reservation of a first particular taxi stop area that is selected based on a current position of the first customer with the reservation among the plurality of particular taxi stop areas.

5. The vehicle dispatch system according to claim 4, wherein:
the reservation information of the first customer with the reservation includes information concerning a destination for the first customer with the reservation; and
the processor is further configured to select the first particular taxi stop area where a terminal device of the first customer with the reservation is notified thereof, based on the destination for the first customer with the reservation.

6. The vehicle dispatch system according to claim 3, wherein:
the reservation information of the first customer with the reservation includes identification information of the first customer with the reservation that is used for decision as to whether or not a customer that takes the first taxi is the first customer with the reservation where the first taxi is assigned thereto; and
the processor is further configured to transmit, in a case where the first taxi is assigned to the first customer with the reservation, the identification information of the first customer with the reservation to the first taxi.

7. The vehicle dispatch system according to claim 6, wherein:
the identification information of the first customer with the reservation includes a two-dimensional code of the first customer with the reservation or photograph information of the first customer with the reservation; and
the processor is further configured to transmit, in a case where the first taxi is assigned to the first customer with the reservation, the two-dimensional code of the first customer with the reservation or the photograph information of the first customer with the reservation to the first taxi.

8. A vehicle dispatch method, comprising storing, in a memory, reservation information where a first taxi has been assigned to a first customer with a reservation and a second taxi that is different from the first taxi has been assigned to a second customer with a reservation that is different from the first customer with the reservation;

in response to being notified, by the first taxi, that the first taxi has been taken by the second customer with the reservation, reassigning the second taxi to the first customer with the reservation and updating the reservation information stored in the memory;

notifying the second taxi of the updated reservation information; and controlling an on-vehicle device that is mounted on the first taxi to transmit, to a vehicle dispatch device, information that indicates that the second customer with the reservation takes the first taxi.

* * * * *